United States Patent [19]
Giancarlo

[11] Patent Number: 4,990,914
[45] Date of Patent: Feb. 5, 1991

[54] METHOD AND APPARATUS FOR INTERPOLATIVE A/D CONVERSION

[75] Inventor: Charles H. Giancarlo, San Francisco, Calif.

[73] Assignee: Siemens Akteingesellschaft, Munich, Fed. Rep. of Germany

[21] Appl. No.: 174,597

[22] Filed: Mar. 29, 1988

Related U.S. Application Data

[63] Continuation-in-part of Ser. No. 445,006, Nov. 29, 1982, abandoned.

[30] Foreign Application Priority Data

Nov. 30, 1981 [DE] Fed. Rep. of Germany ....... 3147409

[51] Int. Cl.[5] .............................................. H03M 3/04
[52] U.S. Cl. ..................................... 341/143; 341/166; 375/28
[58] Field of Search ............... 341/143, 126, 155, 166, 341/200; 375/26, 27, 28, 34; 381/29

[56] References Cited

U.S. PATENT DOCUMENTS

| 3,908,181 | 9/1975 | Shigaki et al. | 341/143 |
| 4,251,804 | 2/1981 | Scardina et al. | 341/143 X |
| 4,509,037 | 4/1985 | Harris | 341/143 |
| 4,684,925 | 8/1987 | Maruta | 341/166 |

Primary Examiner—William M. Shoop, Jr.
Assistant Examiner—Brian K. Young
Attorney, Agent, or Firm—Herbert L. Lerner; Laurence A. Greenberg

[57] ABSTRACT

A method for A/D conversion, which includes integrating by analog apparatus, amplifying and subsequently quantizing an analog input signal for producing a quantized signal having n bits, wherein n>1, and feeding back the quantized signal to the input signal. The improvement includes integrating digitally the quantized signal by an arrangement of periodic digital summation, converting the quantized signal into an analog signal, and feeding back the analog signal to the input signal. An apparatus for carrying out the method is also disclosed.

11 Claims, 3 Drawing Sheets

SCANNING FREQUENCY

METHOD AND APPARATUS FOR INTERPOLATIVE A/D CONVERSION

This is a continuation-in-part of application Ser. No. 445,006 filed Nov. 29, 1982, now abandoned. The invention relates to a method and apparatus for analog to digital (A/D) conversion, in which the analog input signal is integrated, amplified and subsequently quantized and in which the quantized signal is fed back to the input signal.

BACKGROUND AND PRIOR ART

Corresponding A/D converters, in spite of their relatively inferior accuracy, and relatively slower components, should have a high signal/noise-ratio, and are producible according to conventional technology. Possible applications are, for example, codec filters for telephone purposes and coding filters for the digitizing of audio signals for high quality digital pick up. Digitizing is understood to mean that a number code is attached to the scanning value of an analog waveform, and is proportional to the size thereof.

A/D converters may work according to different methods, and in doing so, the commonly used methods as a rule require the use of very precise working components. In order to reduce the required precision for the analog components, which are required for the conversion process, the delta modulation method has recently been used. The delta modulation techniques, however, require very high scanning rates. As illustrated in the publication by K. Niwa, A. Yukawa, A. Tomozowa, "A Discretely Adaptive Delta Modulation Codec", IEEE Transaction on Communications, Vol. Com-29, No. 2, Feb. 1981, pages 168 to 173, it is seen that the delta modulation codec has a so-called slope adaptive circuit in the feedback circuit, which causes large gradients of the input signal to correspond to large level variations of the quantization output (and vice versa). However, the codec requires a very high frequency for the operation of the slope adaptive circuit. Furthermore, because the scan frequency is high, the adaptation is quasicontinuous and can, therefore, only respond relatively slowly to a step-shaped input impulse. Eventually, this codec has an analog integrator and merely a comparator on the input side.

As illustrated in the publication by T. Last "Proportional Step Size Tracking Analog to Digital Converter", Rev. Sci. Instrum., 51 (3), Mar. 1980, pages 369 to 374, an A/D converter is known, which likewise has a slope adaptive circuit. This circuit is formed from a quantizer and an upward/downward counter. This circuit, however, has no analog circuit nor analog function, and acts as a simple A/D converter and not as a delta modulator. Furthermore, this converter likewise carries out no integration on the input side, and therefore has a high quantizer noise level. There is no feedback of errors in the modulation cycle, in order to reduce the accumulated error in the following cycle.

As illustrated in the publication by F. de Jager, "Delta Modulation a Method of PCM Transmission using the 1- Unit Code", Phillips Res. Rept., Vol. 7, pages 442 to 466, 1952, delta modulation is known, which uses a slope adaptive modulation circuit in the form of an analog integrator. This system has two analog integrators, one of which is disposed in the input circuit. The utilization of two analog integrators leads to a considerable reduction of the tolerance of the analog components and causes considerable design problems for the creation of a stable circuit, and is economically unfavorable.

As illustrated in the publication by J.C. Candy, "A use of Limit Cycle Oscillations to Obtain Robust Analog to Digital Converters", IEEE Trans. on Communications, Vol. COM-22, Bo. 3, Mar. 1974, pages 298 to 305 and B. A. Wooley, I. L. Henry, "An Integrated Per-Channel PCM Encoder Based on Interpolation", IEEE Journal of Solid-State Circuits, Vol. SC-14, No. 1, Feb. 1979, pages 14 to 20, are known A/D converters, in which through the disposition of an integration and amplification element in the input circuit, the scanning rate is reduced and the signal/noise ratio is increased. However, the feedback is formed of a direct feedback of the quantization of the output of the integration and amplification element, so that the number of possible digital estimates of the input signal are reduced to the number of the quantization level of the quantizer. Furthermore the circuit is not slope adaptive.

It is accordingly an object of the invention to provide a method and apparatus for A/D conversion, which overcomes the hereinafore-mentioned disadvantages of the heretofore-known methods and devices of this general type, which works according to the delta modulation principle, which supplies a high signal/noise-ratio with relatively small scanning rates and with high precision, which tolerates considerable deviations in the value of its components without large errors in the digital output signal and without instability of the circuit, and consequently has a large stability range.

SUMMARY OF THE INVENTION

With the foregoing and other objects in view there is provided, a method for A/D conversion, which comprises integrating and amplifying by analog means, subsequently quantizing an analog input signal for producing a quantized signal having n bits, wherein $n>1$, integrating digitally the quantized signal by means of a periodic digital summation into a digital signal having N bits wherein $N>n$, converting the digital signal into an analog signal, and feeding back the analog signal to the input signal.

In order to carry out the method, there is provided an apparatus for A/D conversion, comprising an output terminal, an analog integration and amplification element being impressed by a difference signal formed from an analog input signal and an analog feedback signal for producing an analog integrated and amplified signal, a quantizer receiving said integrated and amplified signal for producing a quantized signal, the quantizer being connected to the analog integration and amplification element and having n quantization steps where $n>1$, a summation register being connected to and impressed by the quantizer for digitally integrating the quantized signal and producing a digital integrated signal having N bits, wherein $N>n$, and a D/A converter being connected to and impressed by the summation register for receiving said digital integrated signal for producing the analog feedback signal.

In accordance with another feature of the invention, the quantizer is in the form of a converter operating according to the parallel method.

In accordance with a further feature of the invention, the quantization steps of the quantizer are companded.

In accordance with an added feature of the invention, the quantization steps of the quantizer are binarily weighted.

In accordance with an additional feature of the invention, the summation register is in the form of an up/-down counter.

In accordance with again another feature of the invention, the quantization steps of the quantizer are linearly weighted.

In accordance with again a further feature of the invention, the summation register is in the form of a full adder.

In accordance with again an added feature of the invention, the integration and amplification element is in the form of an operational amplifier having a series feedback connection formed of a feedback resistor and a feedback capacitor.

In accordance with again an additional feature of the invention, the amplification and integration element has a time constant in the range of ±20 percent of a scanning period and an amplification factor in the range between 1.2 and 1.8, the quantizer has an amplification factor in the range between 0.5 and 1, and the scanning rate is in the range between 100 kHz and 2 MHz.

In accordance with a concomitant feature of the invention, the quantizer includes a sign comparator and between 7 and 10 bipolar comparators having binarily weighted reference voltages, and the summation register has a width of between 9 and 13 bits and a sign bit.

With the help of the modified delta modulation circuit which, in accordance with the invention, works in a "slope adaptative" manner and has a quantizer and a summation register, to succeed in improving the precision of the digital estimate of the input signal. The slope adaptive circuit can operate with only one clock and can therefore use the same clock as the whole modulator circuit. Errors in the quantizer cause a smaller error in the converter process, if the quantization levels are chosen close to an optimal point.

The summation register is formed of conventional digital circuits and is therefore simple and economically favorable to produce. The integration and amplification element can be provided in the form of one or more conventional operational amplifiers. For the conversion of the digital estimate of the input signal in the summation register to one analog value, before the feedback to the integration and amplification element, it is only necessary to use a digital/analog (D/A) converter with a smaller degree of precision. The digital output signal can be obtained either from the summation register or from the output of the quantizer. It can subsequently be operated in a known manner, for quality improvement with the digital filters, or it can also subsequently be operated directly.

The slope adaptive circuit according to the invention increases the precision of the digital estimate of the input signal, and consequently solves the problem of reducing the scanning rate in comparison to the modulators according to the state of the art, and it guarantees a certain signal/noise level. The slope adaptive circuit is formed in a simple manner, of an A/D converter ("Flash" A/D converter), which works according to the parallel process known in the art, which quantizes the output of the integration and amplification element. The output signal of this quantizer represents effectively the change of the input signal since the previous rating, and consequently the slope. This information is given to the summation register, in order to modify the size of the change.

In one embodiment of the invention applicable for telephone purposes, the quantization levels of the quantizer are companded or compressed, corresponding, for example, to the binary partial ratio of the reference voltage. The digital summation register and the D/A converter are constructed in such a manner that each register position corresponds to a voltage level of the quantizer (optimal point), which is multiplied by a scaler value determined through the amplification factor of the integration and amplification element. During each cycle a binary "1" is added or subtracted to an individual bit position of the register, in order to modify the content, so that the addition or subtraction can be performed in a known manner.

In another embodiment of the invention, a linear quantizer, an adder and a register are used. The content of the register is always fed back to an input of the adder. The second input of the adder is connected to the coded output of the quantizer. In this way the register content is modified with each cycle, through the output of the quantizer.

In both embodiments mentioned above, the output of the register is converted to an analog signal. In doing so, a D/A converter is used, which need have only moderate precision. For example, a D/A converter with a ladder network can be used like the converter known from the publication by U. Tietze and Ch. Schenk, Halbleiter-Schaltungstechnik, (semiconductor circuit technique) Springer Verlag Berlin, Heidelberg, New York, 1980, pages 635 to 638. These results mean that the output signals of the D/A converter are eventually subtracted from the analog input signal at the input of the integration and amplification element. In this manner, the slope adaptive circuit improves the precision of each digital estimate of the input signal, and also improves the signal/noise-ratio. For this reason, it requires less "oversampling" (i.e. a scanning frequency greater than double the frequency, which is to be processed), and it consequently requires less digital filtering to reach the desired signal/noise level.

Another problem which is solved through the invention, is the enlargement of the stable range in a delta modulation circuit with a double integrator, as compared to the systems with double integration with very small stability ranges, according to the state of the art. The present invention modifies the operation equations of the modulator through the addition of the stabilization term. This stabilization results from the fact that the output of the integration and amplification element is not integrated continuously, but rather is scanned and is summed only at discrete time points (determined from the clock addressing the summation register). In this way, the modulator circuit is automatically stable.

Another problem which is solved through the invention, is the slow respond of most of the delta modulator systems, according to the state of the art, which use an integration and amplification element in the input part or in the forward direction. While the content of the summation register can be changed by each cycle corresponding to the value of the highest quantization level of the quantizer, if it is required, a limitation of the speed of the respond does not exist in the present invention.

Other features which are considered as characteristic for the invention are set forth in the appended claims.

Although the invention is illustrated and described herein as embodied in a method and apparatus for A/D conversion, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
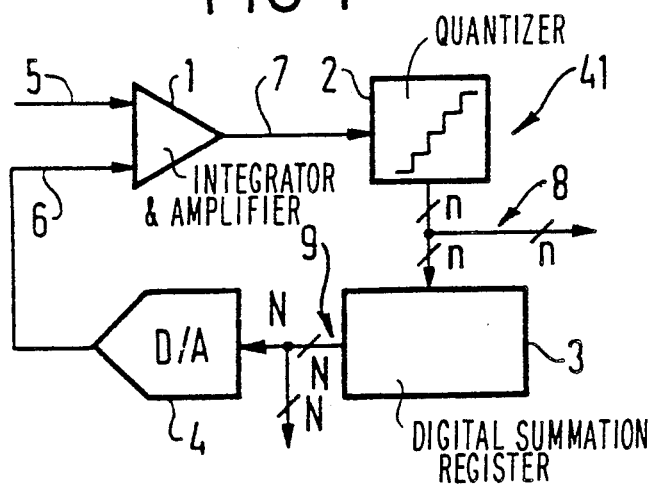
FIG. 1 is a block and schematic circuit diagram of a delta modulator with a slope adaptive circuit.

Referring now to the figures of the drawing, in which corresponding elements have been given the same reference symbols, and first particularly to FIG. 1 thereof, there is seen a schematic and block diagram of an embodiment example of an A/D converter 41 according to the invention. An analog circuit 1 performs the summation of the integration and amplification of the difference of an analog input signal 5, and an approximation (i.e. an "estimate") of an input signal 6. A quantizer 2 converts an analog output signal 7 of the analog circuit 1 to a digital signal 8 from n bit width or range, whereby n>1 and whereby the resolution of the quantizer 2 is finer than the desired resolution of the A/D converter 41. A summation register 3 performs an addition or subtraction of the output 8 of the quantizer 2 to or from its contents. A digital/analog converter 4 converts the digital word, which comes from the output 9 of the summation register 3, into an analog value, which leads to the input 6 of the analog circuit 1.

The apparatus according to FIG. 1 works in such a manner that the analog input signal 5 is added to the inverted analog value 6 of the last digital approximation (i.e. "digital estimate") of the input signal. The difference signal is continuously integrated and amplified. The values of the integrated difference signal and the amplified difference signal are added. This process can be done in a simple manner using a conventional operational amplifier, which in an ordinary feedback configuration has a series circuit of a capacitor 17 and a resistance 16. According to the invention the time constant of the integration is chosen in such a way that the time constant deviates by a maximum of 20 percent from the scanning interval, which is generally determined through the clock driving the summation register 3. Preferably, the time constant of the integration corresponds to the scanning interval The amplification factor is between 1 and 2, preferably between 1.2 and 1.8, and the optimal value is 1.5.

Figure 2:
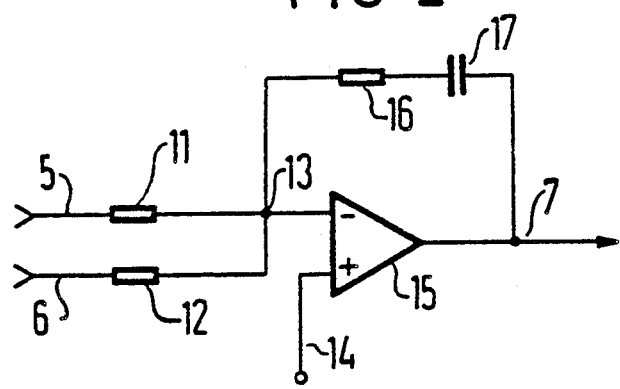
FIG. 2 is a schematic circuit diagram of an embodiment example of an integration and amplification element used in the circuit of FIG. 1.

An embodiment example for the construction of the analog circuit 1 of FIG. 1 is shown in FIG. 2. The analog input signal 5 leads into a first resistor 11, while the inverted "estimate signal" 6 directly received from the D/A converter 4 of FIG. 1, leads into a second resistor 12. Both resistors 11 and 12 are of approximately the same size and effectively provide an addition of the flow of the signals 5 and 6. At a connection point 13 at which the ends of the resistors 11 and 12 which are not driven by the signals 5 or 6 are connected, a signal is also present. The signal represents the sum of the input signal 5 and the inverted estimate signal 6. The connection point 13 is at the same time connected to the negative input of an operational amplifier 15. The positive input 14 of the operational amplifier 15 is connected to ground. The input 14 can also be connected to an automatic neutral or zero point adjustment or balancing, that provides a voltage, which corresponds to the direct current component of the signal 5. Between the output 7 and the negative input 13 of the operational amplifier 15, a series connection of the negative feedback resistor 16 and the negative feedback or reaction capacitor 17 is disposed. The resistance of the feedback resistor 16 is larger by a factor of 1 to 2 than the resistance of the resistors 11 and 12 which are used for the amplification function. The feedback capacitor 17 forms the integration function, in which the time constant is determined through the values of the resistors 16 and 11 or 12. The output signal 7 of the operation amplifier 15 is then inverted, so that it represents an integrated and amplified value of the signal which is present at the negative input 13.

The analog integration and amplification element 1 of FIG. 1 can also be constructed in another way. For example, it is possible to assign separate circuits for the integration and for the amplification, and to subsequently add the output signals of these separate circuits, to reach the desired integration and amplification function.

The integrated and amplified value of the difference signal is then quantized to one of n possible digital values. This value is an approximate measurement of the change of the input signals during the last scanning period. The quantizer 2 can be formed in many ways. In order to attain the necessary speed, it is preferable that a quantizer 2 be used, which works according to the parallel process. For example, it can use $$\frac{n-1}{2}$$

comparators, which are connected with different positive voltage levels and with "zero" as the reference voltages. In this case, an absolute value former can be used to always hold the input of the quantizer positive. It is also possible to construct the quantizer 2 in MOS technology, to use only a positive voltage in the quantizer through a switched capacitor technique, and to change the polarity of the input signal or the reference voltages before the comparators as a function of the sign of the input signal or the sign of the comparator. Another embodiment example is the use of n comparators, whose reference voltages have both positive and negative levels.

The reference voltage level in the quantizer 2 must correspond to the levels which are multiplied by a factor $\beta$, that corresponds to the digital code of the quantizer 2. Because of stability reasons, the value of the factor $\beta$ is determined through the amplification of the analog integration and amplification element 1 by the relation:

$$\frac{A}{A-1} > \beta > \frac{A}{A+1}$$

where A is the amplification factor of the analog integration and amplification element 1; and $\beta$ is the reciprocal amplification factor of the quantizer 2. In the case where A=1.5, the optimal value of the reciprocal amplification factor $\beta$ of the quantizer 2 is 1.5.

Figure 3:
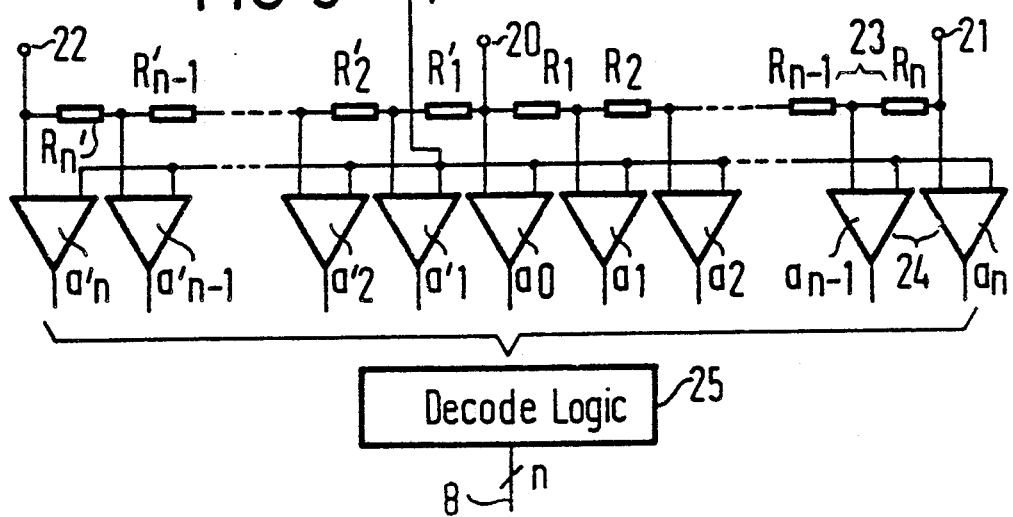
FIG. 3 is a schematic circuit diagram of an embodiment example of a quantizer used in the circuit of FIG. 1.

FIG. 3 shows the circuit diagram of an embodiment example of a possible construction of the quantizer 2. The quantizer 2 is formed of comparators 24 $a_0$-$a_n$ and $a_1'$ to $a_n'$, resistors 23 $R_1$-23 $R_n$ and $R_1'$ to $R_n'$, positive and negative reference voltages 21 and 22 and a decoder logic 25. The comparators 24 and the resistors 23 which form the reference voltages are connected in series in a known manner, according to the parallel method. In this embodiment the resistances $R_i$ are equal to the resistances $R_i'$, and the comparators 24 are formed identically. If there are companded levels to be realized, the resistances 23, for example, can be measured in such a manner that $R_i = \frac{1}{2} R_{i+1}$.

The decoder logic 25 then gives the value of a binary "1" to the n output lines 8 and the value of a binary "zero" to the remaining output lines 8 (or to a coded form thereof), depending upon the level of the input signal 7.

The decoder logic 25 also can be constructed as a conventional priority decoder.

Another embodiment example measures the resistors 23 so that $R_i = R_{i+1}$, whereby a linear quantizer is obtained. The decoder logic 25 must then produce a digital word on the output 8, which represents the level of the input 7. The connection line 20 in FIG. 3 is connected to ground, and the comparator $a_0$ serves for determining the sign of the signal next to the point 7. If there is an absolute value former connected between the input 7 and the inputs of the comparators $a_1$-$a_n$, then only the resistors $R_1$ to $R_n$, the comparators $a_0$ $a_n$ to an and one positive reference voltage 21 are necessary.

Other possibilities of the realization of a quantizer 2, which works according to the parallel method, for example, are known from "Elektronik" (Electronic) 1975, issue 11, pages 86 to 87 or in U. Tietze, Ch. Schenk, "Halbleiter-Schaltungstechnik" (semiconductor circuit technology), Springer Verlag, Berlin, Heidelberg, New York, 1980, pages 649 to 657.

The output code of the quantizer is subsequently loaded into the digital summation register 3.

The summation register 3 can be like an up-down counter, in which the counter process can begin on each bit position, if a quantizer 2 with binary weighting, or in another manner where companded quantization levels, are used. If a quantizer 2 is used, where the quantizational level is weighted linearly, then it is advantageous to provide a summation register 3, which uses a parallel full adder.

Figure 4:
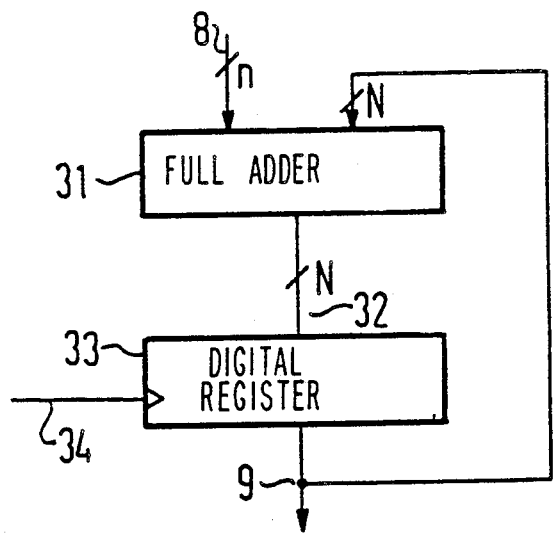
FIG. 4 is a block circuit diagram of an embodiment example of a digital summation register used in the circuit of FIG. 1.

The block diagram of an embodiment of a summation register 3 shown in FIG. 4, is formed of a full adder (parallel adder) 31 and a digital register 33 with a bit width of N, wherein N generally is equal to n+2 or n+3, with n being the number of the quantization steps of the quantizer 2 or the outputs 8 of the quantizer 2. The output 9 of the register 33 is fed back to one of the inputs of the adder 31. The other input of the adder 31 is connected to the output 8 of the decoder logic 25 of FIG. 3. The new value for the register 33 appears on the N bit width line 32, which connects the output of the adder 31 with the input of the register 33, and will store it every T seconds in the register 33 through the clock signal 34 driving the register 33. T is the scanning time of the total modulator circuit, while apart from the register 33, all other components of the modulator circuit are not clock controlled The value in the register 33 can be stored away by sign-magnitude or two's complement code, depending upon the structure of the decoder logic 25 of FIG. 3, of the parallel adder 31 and the D/A converter 4 of FIG. 1. Furthermore, it is possible to connect the summation register of FIG. 4 with a companded quantizer as a modified up/down counter, for example, as known from the publication by T.A. Last, Rev. Sci. Instrum., 51 (3), Mar. 1980, pages 369 to 374.

The summation register 3 stores each new digital approximation (i.e. "estimate") value of the input signal. The content is converted into an analog voltage through the D/A converter 4, which only has a moderate accuracy. Simulations and experiments have shown that a 2 percent error in the D/A converter causes an amplification error, which is less than 0.15 dB over an input amplitude range of 80 dB. The analog output 6 of the D/A converter 4 is already present in the conventional D/A converter in an inverted form, and is subtracted from the input signal 5 and, consequently, the modulator circuit is completed.

The digital estimate of the input signal which is subsequently worked on, can be taken directly from the output 9 of the register 32 or from the summation register 3. It is also possible to take this digital estimate in a simple but coded form, from the output 8 of the quantizer 2. Both outputs can be subsequently worked on by using digital filters for the improvement of the accuracy and for the decrease of the quantization noise. The filters can be made in a conventional form, such as in a transversal or recursive form.

The transfer function of the modulator 41 is as follows:

$$\left| \frac{V_{out}}{V_{in}} \right| = \frac{\omega \frac{T}{\pi}}{\sin \omega \frac{T}{\pi}} \sqrt{ \frac{\left(\frac{R_{16}}{R_{11}} + \frac{1}{2}\right)^2 + \left(\frac{T}{2} \frac{R_{16}}{R_{11}} \omega - \frac{1}{\omega R_{11} C_{17}}\right)^2}{\left(\frac{R_{16}}{R_{11}} + \frac{1}{2}\right)^2 + \left(\frac{T}{2} \frac{R_{16}}{R_{11}} \omega - \frac{1}{\omega R_{11} C_{17}} + \frac{(\omega T)^2}{\pi \beta \sin \omega T}\right)^2} }$$

where:
$V_{out}$ is the output voltage:
$V_{in}$ is the input voltage:
T is the scanning period:
$R_{11}$, $R_{16}$, $C_{17}$ are values of the resistors 11 and 16 or the capacitor 17 of FIG. 2; and β is the reciprocal amplification factor of the quantizer 2.

Figure 5:
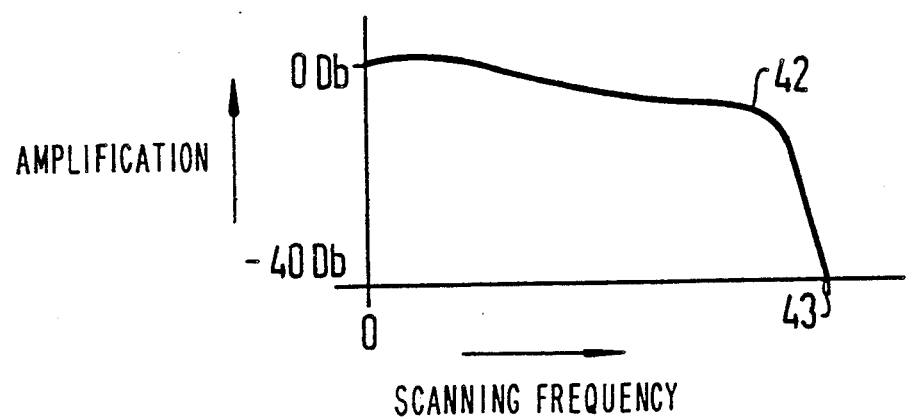
FIG. 5 is a graph of the transfer function of a converter circuit according to the invention.

FIG. 5 shows a typical transfer curve 42 of the modulator 41. The curve 42 shows a smaller amplification at lower frequencies and a zero position at a scanning frequency 43.

Figure 6:
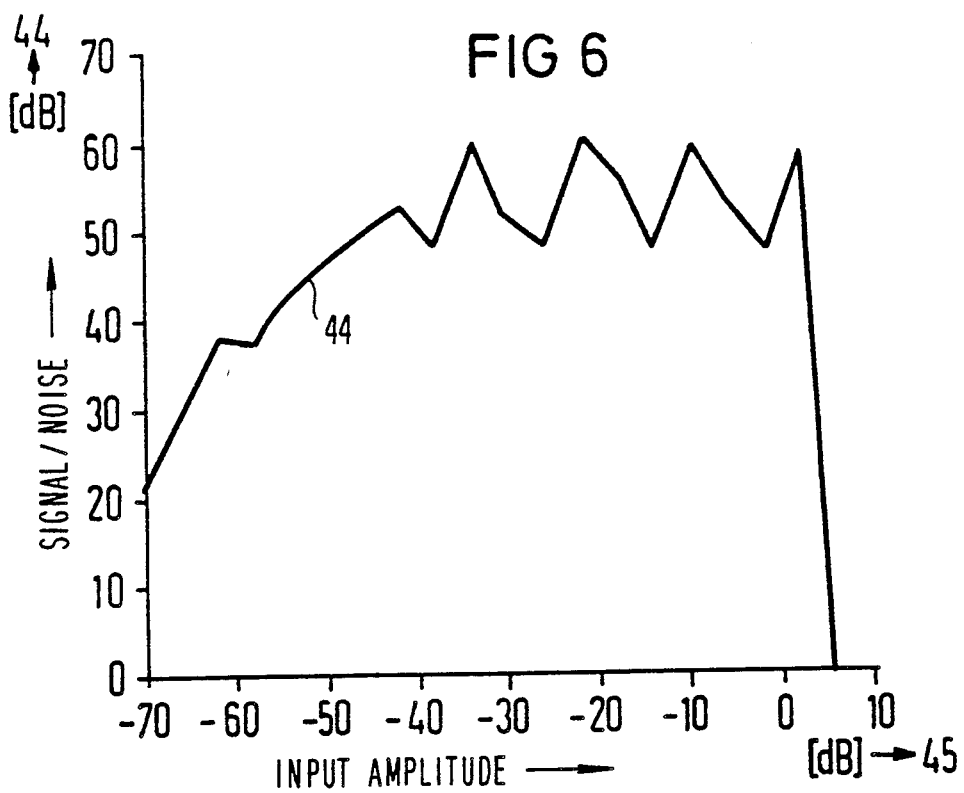
FIG. 6 is a graphical example of a signal-noise ratio curve, which is developed through the converter, and works with the method according to the invention.

FIG. 6 shows a typical signal/noise curve 44 of an A/D converter according to the invention, as a function of the input amplitude 45, whereby the D/A converter 4 has an error of 2 percent and conducts a conventional digital filtration with a down sampling filter of 8 kHz. This curve concerns a modulator with an input frequency of 811 Hz, a scanning frequency of 128 kHz, a forward amplification of the integration and amplification element 1 of 1.5, an integration time constant of the element 1 of 8 $\mu s$, a companded quantizer with a total of 17 reference voltage levels (n=8) and an amplification factor of 0.7, wherein 3 dB in the figure corresponds to the maximum level of the D/A converter.

Figure 7:
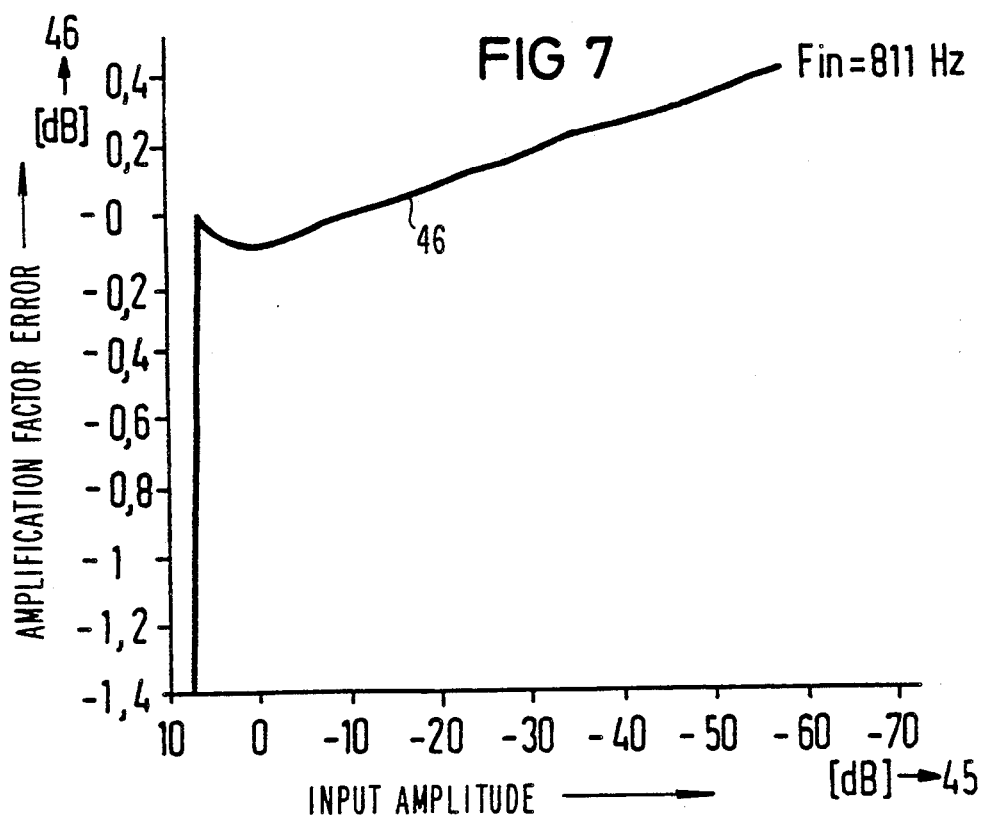
FIG. 7 is a graphical example of an amplification error curve with a converter which works according to the invention.

FIG. 7 shows, as does FIG. 6, an embodiment of a typical amplification factor error curve 46, as a function of the input amplitude 45.

In another embodiment example for an A/D converter according to the invention, the time constant of the integration and amplification element is 7.8 $\mu s$, its forward amplification is 1.5, the amplification factor of the quantizer 2 is 0.67, and the quantizer 2 has a sign comparator and 8 or 9 bipolar comparators, whose reference voltages are binary weighted. The summation register 3 is 10 bit or 12 bit wide and has a sign bit, and the scanning rate is 128 kHz.

Generally, it is an advantage to chose the time constant of the analog integration and amplification element 1 in the range of a 20 percent of the scanning rate T, and the amplification of the integration and amplification element 1 in the range between 1.2 and 1.8. Advantageous values for the amplification factor 1/β of the quantizer 2 are 0.5 to 1, the quantizer 2 is advantageously formed of a sign comparator, 7 to 9 comparators, whose reference voltages are binary weighted and are bipolar (positive and negative), and whose summation register 3 has 9 to 13 bits and a sign bit. The scanning frequency (1/T), for example, can be chosen in the range between 100 kHz and 2 MHz.

The A/D converter according to the invention, is created as a modulation circuit with double integration. The first integration is made through the difference of the input signal and the estimate signal, and is analog, while the second integration is digital, and is made through periodic summation of the digitized output of the first analog integrator, and can also be called a sigma-delta-sigma modulator. The number of possible digital estimates of the input signal of the present invention roughly amounts to $2^N$, wherein N is the width of the summation register and is >n by typically 2 to 3, and the summation register 3 is typically 2 to 3 bits wider than the number of the quantized levels n. This considerably improves the signal/noise quality of the A/D converter according to the invention as compared to the state of the art.

The foregoing is a description corresponding to German Application P No. 31 47 409.8, dated Nov. 30, 1981, the International priority of which is being claimed for the instant application and which is hereby made part of this application. Any discrepancies between the foregoing specification and the aforementioned corresponding German application are to be resolved in favor of the latter.

I claim:
1. A method using a delta modulator for converting an analog input signal to a digital output signal, comprising the steps of:
   (a) forming in an analog summing circuit an analog difference signal between said analog input signal and an analog estimate signal of said analog input signal;
   (b) integrating and amplifying in an analog integrator said analog difference signal, forming an analog integrated difference signal;
   (c) quantizing in a quantizer said analog integrated difference signal, forming a digital quantized signal having a bit width equal to n;
   (d) summing said digital quantized signal in a digital summation register having a bit width equal to N, wherein N>n, forming a digital estimate of said analog input signal;
   (e) converting in a digital-to-analog converter said digital estimate to form said analog estimate of said input signal.

2. A delta modulator for converting an analog input signal to a digital output signal, comprising:
   (a) an analog summing circuit for forming an analog difference signal between the analog input signal and an analog estimate signal of said analog input signal;
   (b) an analog integrator for integrating and amplifying said analog difference signal, forming an analog integrated difference signal;
   (c) a quantizer for quantizing said analog integrated difference signal, forming a digital quantized signal of quantizing steps having a bit width equal to n;
   (d) a digital summation register having a bit width equal to N, wherein N is greater than n, for receiving said digital quantized signal and forming a digital estimate of said analog input signal;
   (e) a digital-to-analog converter for converting said digital estimate to form said analog estimate signal.

3. Apparatus according to claim 2 wherein said quantizer includes an n bit wide parallel operating analog-to-digital converter.

4. Apparatus according to claim 2 wherein said quantizing steps of said quantizer are companded.

5. Apparatus according to claim 2, wherein said quantizing steps are binarily weighted.

6. Apparatus according to claim 2, wherein said summation register includes an up/down counter.

7. Apparatus according to claim 2, wherein said quantizing steps are linearly weighted.

8. Apparatus according to claim 2, wherein said digital summation register includes a full adder having two summing inputs and an output connected back to one of said summing inputs.

9. Apparatus according to claim 2, wherein said analog integrator includes an operational amplifier having a feedback including a series-connected resistor and capacitor.

10. Apparatus according to claim 9, wherein said analog integrator has a time constant in the range of ±20 percent of a scanning period, and said scanning period is in a range from 1/100 000 to $1/(2 \times 10^6)$ seconds.

11. Apparatus according to claim 2, wherein said quantizer includes a sign comparator and a plurality of bipolar comparators having binarily weighted reference voltages, said plurality is in a range from 7 to 10, and said summation register has a bit width in a range from 9 to 13 bits and a sign bit.

* * * * *